(12) United States Patent
Devilliers

(10) Patent No.: US 6,322,115 B1
(45) Date of Patent: Nov. 27, 2001

(54) BUMPER STRIP AND A BUMPER FITTED WITH SUCH A STRIP

(75) Inventor: Olivier Devilliers, Chalendrey (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/610,781

(22) Filed: Jul. 6, 2000

(30) Foreign Application Priority Data

Jul. 6, 1999 (FR) .................................................. 99 08689

(51) Int. Cl.⁷ .................................................. B60R 19/08
(52) U.S. Cl. ..................... 293/142; 293/120; 293/128; 293/155
(58) Field of Search .................... 293/121, 128, 293/142, 155, 120

(56) References Cited

U.S. PATENT DOCUMENTS

| 3,606,433 | * | 9/1971 | Kunevicius . | |
| 4,474,395 | * | 10/1984 | Harloff et al. | 293/120 |
| 4,966,245 | | 10/1990 | Pfister . | |
| 5,149,569 | * | 9/1992 | McCue | 296/128 X |
| 5,202,172 | * | 4/1993 | Graf | 293/128 |
| 5,290,078 | * | 3/1994 | Bayer et al. | 293/120 |
| 5,338,077 | * | 8/1994 | Haberle et al. | 296/120 |
| 5,498,044 | * | 3/1996 | Bovellan et al. | 293/120 |
| 6,010,169 | * | 1/2000 | Cox et al. | 293/120 |

FOREIGN PATENT DOCUMENTS

| 29 34 458 | 3/1981 | (DE) . |
| 31 25 650 | 1/1983 | (DE) . |
| 196 16 958 | 12/1996 | (DE) . |
| 0 343 546 | 11/1989 | (EP) . |
| 2 030 082 | 4/1980 | (GB) . |

* cited by examiner

Primary Examiner—Joseph D. Pape
(74) Attorney, Agent, or Firm—Schweitzer Cornman Gross & Bondell LLP

(57) ABSTRACT

The invention relates to a motor vehicle bumper strip, said strip having a channel-section with an upright web and being suitable for being fixed to a bumper by snap-fastening along the longitudinal edges thereof. It comprises at least one projection directed towards the inside of the channel-section on at least one of its longitudinal edges.

2 Claims, 2 Drawing Sheets

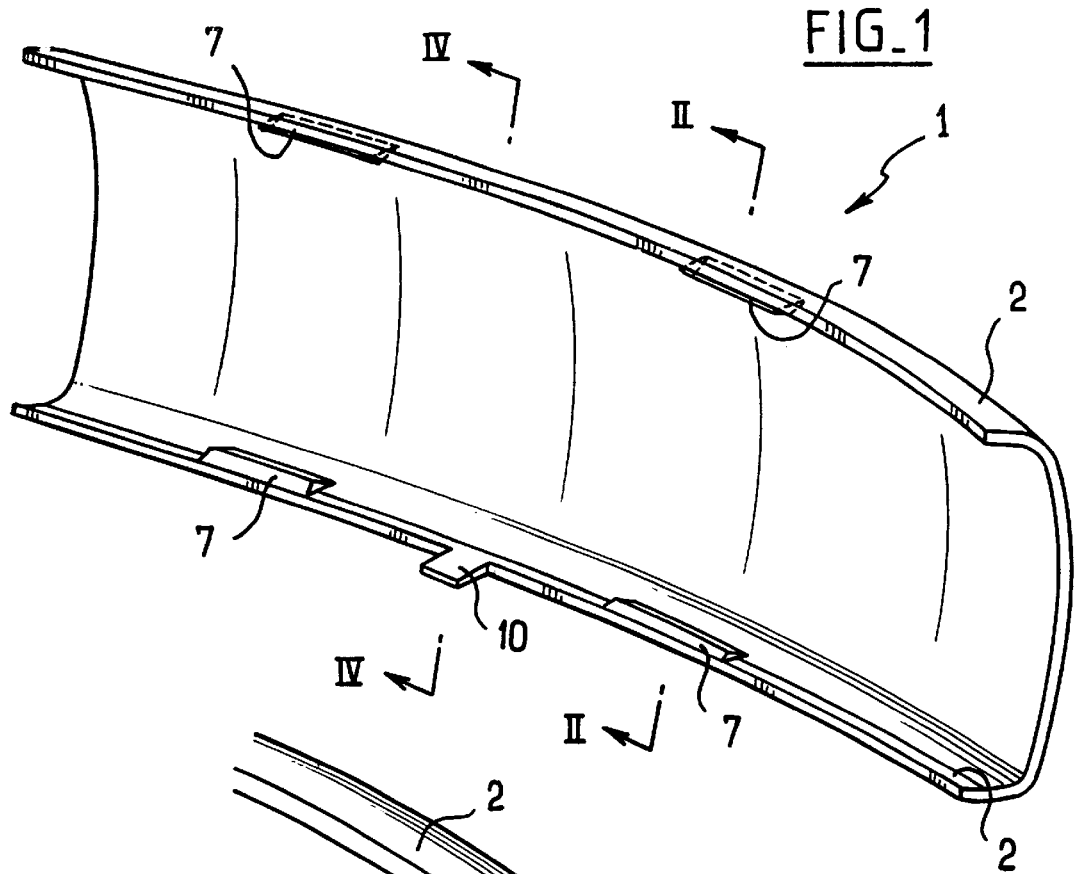
FIG_1
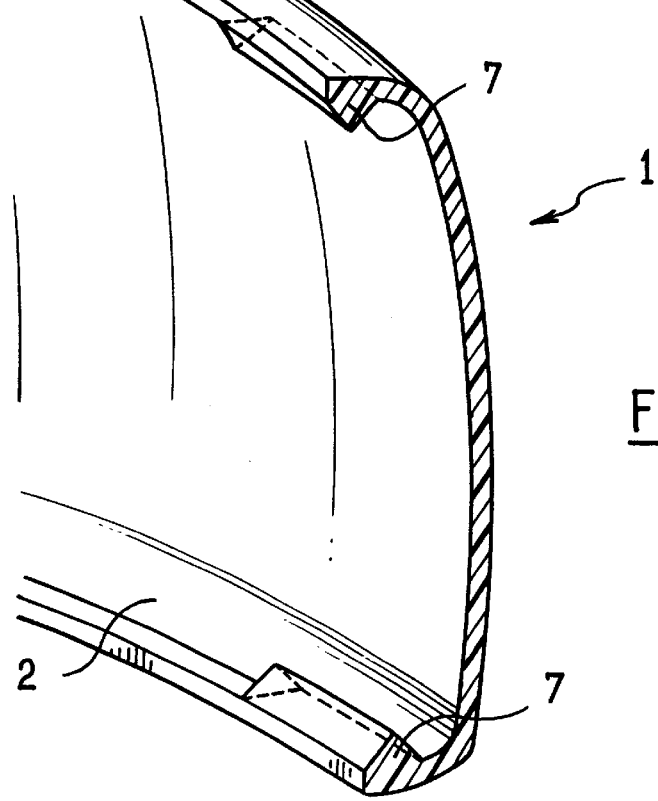
FIG_2

BUMPER STRIP AND A BUMPER FITTED WITH SUCH A STRIP

The present invention relates to a bumper strip and to a bumper fitted with such a strip.

BACKGROUND OF THE INVENTION

It is known that the bumper of a motor vehicle can be protected by means of a strip which generally occupies a zone of the skin of the bumper that is the most exposed to rubbing against obstacles such as the bumpers of other vehicles, particularly while parking. The strip can have the same color as the bumper or it can be of a different color, depending on the look of the vehicle.

Such a strip is generally fixed in place by snap-fastening, and for this purpose the strip has resilient tongues on its longitudinal edges that penetrate into slots in the skin of the bumper.

The resilient tongues extend horizontally into the vehicle and project from the inside face of the skin of the bumper. By moving vertically, they can engage the skin, returning resiliently towards the outside of the strip, i.e. upwards for the tongues on the top longitudinal edge of the strip and downwards for the tongues on the bottom longitudinal edge of the strip.

That method of fixing serves to hold the strip in place, but it suffers from certain drawbacks.

Firstly, it has been found that the strip tends to shrink after molding, curling up on itself in vertical section so that the tongues on the top and bottom edges of the strip move towards each other, weakening them when it comes to fastening them to the skin of the bumper.

In an attempt or resolve that problem, fluting has been added to the skin in order to support the tongues horizontally and prevent them from moving towards each other while the strip is being removed, however such fluting makes it more difficult to put the strip into place.

In addition, the room available inside the skin of the bumper is not always sufficient to allow the snap-fastening tongues to extend far enough. A metal cross-member reinforcing the bumper is often located close to the skin thereof, which makes it necessary for fixing the strip to provide holes in the cross-member for receiving the resilient tongues.

OBJECTS AND SUMMARY OF THE INVENTION

The present invention seeks to provide a novel bumper strip whose fastening on the skin of a bumper does not present the drawbacks mentioned above.

The present invention provides a motor vehicle bumper strip, said strip having a channel-section with an upright web and being suitable for being fixed to a bumper by snap-fastening along the longitudinal edges thereof, the strip including at least one projection directed towards the inside of the channel-section on at least one of its longitudinal edges.

The strip of the invention does not have any fastening tongues extending its longitudinal edges and that would project from the inside face of the skin of the bumper when the strip is mounted on said skin.

Consequently, if a cross-member needs to be located in the immediate vicinity of the skin of the bumper, the presence of a strip of the invention does not require any hole to be made in the cross-member.

The projections from the strip perform the same function as the resilient tongues of prior strips, but in the strip of the invention, these projections are rigid and it is the resilience of the strip over its entire height that enables its longitudinal edges to move vertically and thus allow the projections to pass through when the strip is mounted on the bumper.

As a result, the strip of the invention cannot be spoilt by any shrinkage which might cause it to close up since any such change to the shape of the strip would serve merely to ensure that it holds onto the skin of the bumper more securely.

The strip of the invention also presents an advantage associated with manufacture by molding.

Whereas the previously-known strip required a mold that was relatively complex because of the presence of the resilient tongues which requires certain portions of the mold to move prior to the strip being ejected, this is no longer the case with the strip of the invention since the projections from the longitudinal edges of the strip can escape from the mold cavity by resiliently deforming the entire strip, in the same manner as is used when removing a strip from a bumper on which it has been snap-fastened.

The present invention also provides a bumper arranged to receive a strip as described above, wherein the skin of the bumper has two longitudinal grooves in its outside face, each for receiving a respective longitudinal edge of the strip, at least one of the grooves being defined internally by a resilient tab cut out in the skin, said resilient tab being capable of deforming resiliently to retract while a projection of the strip is being inserted and then returning resiliently to retain said projection after it has been inserted.

BRIEF DESCRIPTION OF THE DRAWINGS

In order to make the invention better understood, there follows a description of an embodiment given as an example that does not limit the scope of the invention, and described with reference to the accompanying drawings, in which:

FIG. 1 is a perspective view of the inside of a portion of a bumper strip constituting an embodiment of the invention;

FIG. 2 is a close-up view in section on II—II of FIG. 1;

MORE DETAILED DESCRIPTION

Figure 5:
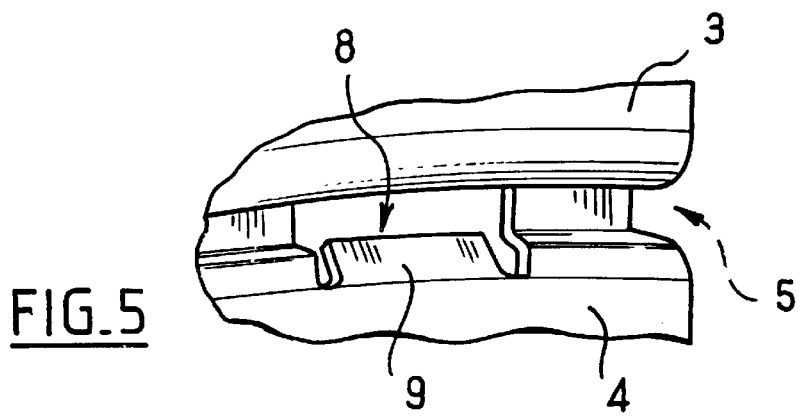
FIG. 5 is a perspective view of a region of the skin of the bumper indicated by arrow V in FIG. 3.

The bumper strip 1 shown in the drawings is a channel-section member with an upright web.

Each of its two longitudinal edges 2 extends horizontally over its entire length.

The strip is designed to cover a central bar 4 of a bumper whose skin 3 (shown in FIGS. 3 and 4) has two longitudinal grooves 5 and 6 forming styling lines in which the two longitudinal edges 2 of the strip are received.

As can be seen in particular in the close-up view of FIG. 2, each longitudinal edge 2 of the strip has a projection 7 on its inside face directed towards the opposite longitudinal edge, each projection 7 being of substantially triangular section and extending longitudinally over a relatively short length.

In the example shown, the strip has four projections 7.

Since the strip 1 is made by molding a plastics material, the projections 7 are formed directly by molding. To this end, the mold cavity used is defined merely by a punch, having a recess corresponding to each projection and a matrix in which the punch is embedded, without any other moving part being required for the mold. The resilience of the strip over its entire height makes it possible to splay apart its two longitudinal edges from each other in order to disengage its projections from the recesses in the punches and thus eject it from the mold.

As can be seen in particular in FIG. 5, each groove 5, 6 in the skin 3 of the bumper includes cutouts 8 in the bottom of the groove in its zones that correspond to the projections on the strip. Each cutout defines a resilient tab 9 adjacent to the inside of the groove, i.e. the side of the groove that is closer to the other groove.

Each of these resilient tabs 9 is suitable for deforming by bending towards the inside of the bumper so as to allow the projections 7 on the strip to pass while the strip is being put into place on the skin of the bumper. Once the projections 7 have gone beyond the resilient tabs 9, they return to their initial positions, as can be seen in FIG. 3, where they prevent the projections from moving out.

The longitudinal edges 2 of the strip 1 are thus held secure in the bottoms of the grooves, and the strip is mounted on the bumper.

Figures 3, 4:
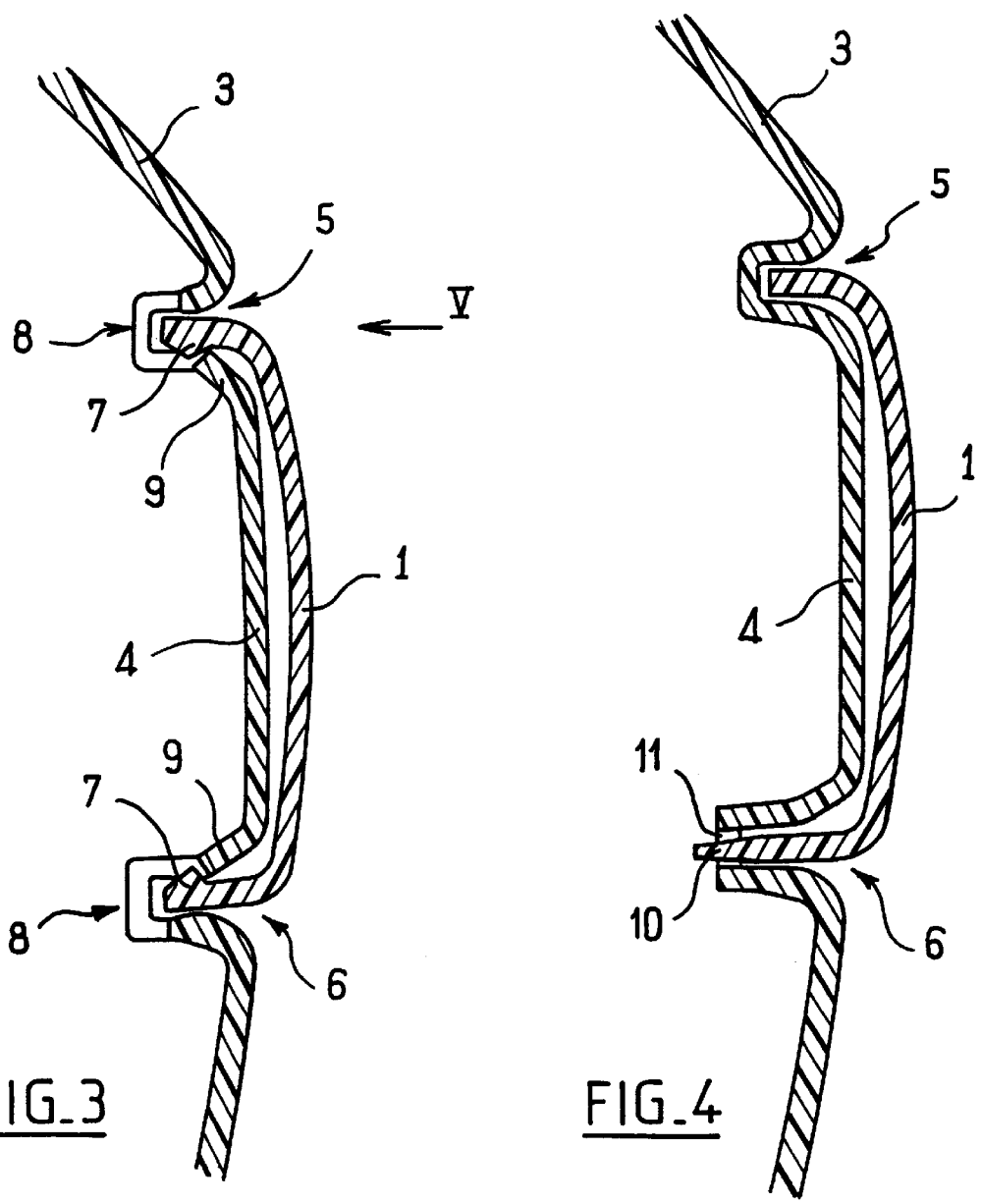
FIG. 3 is a section on II—II of FIG. 1.
FIG. 4 is a section on IV—IV of FIG. 1.

As can be seen in FIGS. 1 and 4, in the middle of its bottom longitudinal edge 2, the strip has a positioning tongue 10 which penetrates into a hole 11 formed in the bottom groove of the skin, in the middle thereof. This tongue 10 enables the strip 1 to be presented to the skin 3 of the bumper in a position such that the projections 7 are in register with the resilient tabs 9.

The strip is removed by deforming the resilient tabs 9 from the inside of the bumper after the bumper has been taken off the vehicle.

Naturally, the embodiment described above is not limiting in any way and can be modified in any desirable manner without thereby going beyond the ambit of the invention.

What is claimed is:

1. A motor vehicle bumper with an affixed bumper strip, in which
   (a) the bumper has a skin with an outer face having two longitudinal grooves for receiving corresponding longitudinal edges of a bumper strip;
   (b) at least one of said grooves having at least one region into which a resilient tab cut from portions of said skin adjacent said groove is disposed;
   (c) a bumper strip having a channel-section with an upright web and being suitable for being fixed to the bumper along the longitudinal edges of said strip;
   (d) the strip including at least one projection directed towards the inside of the channel-section on at least one of its longitudinal edges and being registrable with said tab;
   (e) said resilient tab being capable of deforming resiliently to retract from the groove while said at least one projection of the strip is being inserted into the groove and then returning resiliently to retain by snap-fastening said projection after it has been inserted into the groove.

2. The motor vehicle bumper with affixed bumper strip of claim 1, wherein
   (a) the at least one projection on said bumper strip is substantially triangular in section.

* * * * *